United States Patent
Xu et al.

(10) Patent No.: US 12,504,051 B1
(45) Date of Patent: Dec. 23, 2025

(54) DUAL-LAYERED GRAPHENE-BASED WET FRICTION MATERIAL

(71) Applicant: Alto Products Corporation, Atmore, AL (US)

(72) Inventors: Jiahui Xu, Atmore, AL (US); David Landa, Pensacola Beach, FL (US); Juncheng Lui, Pensacola, FL (US); Ray Engel, Pensacola, FL (US)

(73) Assignee: Alto Products Corporation, Atmore, AL (US)

( * ) Notice: Subject to any disclaimer, the term of this patent is extended or adjusted under 35 U.S.C. 154(b) by 494 days.

(21) Appl. No.: 17/957,525

(22) Filed: Sep. 30, 2022

(51) Int. Cl.
| | |
|---|---|
| F16D 69/02 | (2006.01) |
| B32B 29/06 | (2006.01) |
| F16D 13/64 | (2006.01) |
| F16D 65/12 | (2006.01) |
| B32B 7/12 | (2006.01) |
| F16D 65/02 | (2006.01) |

(52) U.S. Cl.
CPC ............ *F16D 65/127* (2013.01); *B32B 29/06* (2013.01); *F16D 13/64* (2013.01); *F16D 65/126* (2013.01); *F16D 69/025* (2013.01); *B32B 7/12* (2013.01); *B32B 2250/40* (2013.01); *B32B 2255/12* (2013.01); *B32B 2255/26* (2013.01); *B32B 2260/028* (2013.01); *B32B 2260/046* (2013.01); *B32B 2262/0269* (2013.01); *B32B 2262/062* (2013.01); *B32B 2262/101* (2013.01); *B32B 2307/306* (2013.01); *B32B 2307/54* (2013.01); *B32B 2307/546* (2013.01); *B32B 2605/00* (2013.01); *F16D 65/128* (2013.01); *F16D 2065/132* (2013.01); *F16D 2200/006* (2013.01); *F16D 2200/0078* (2013.01); *F16D 2200/0091* (2013.01)

(58) Field of Classification Search
CPC ....... B32B 29/06; B32B 7/12; B32B 2250/40; B32B 2255/12; B32B 2255/26; B32B 2260/028; B32B 2260/046; B32B 2262/0269; B32B 2262/062; B32B 2262/101; B32B 2307/306; B32B 2307/54; B32B 2307/546; B32B 2605/00; F16D 13/64; F16D 65/126; F16D 65/127; F16D 65/128; F16D 69/025; F16D 2065/132; F16D 2200/006; F16D 2200/0078; F16D 2200/0091
See application file for complete search history.

(56) References Cited

U.S. PATENT DOCUMENTS

| | | | | |
|---|---|---|---|---|
| 6,194,059 | B1 * | 2/2001 | Yesnik | F16D 69/026 428/218 |
| 11,274,721 | B2 * | 3/2022 | Sin Xicola | F16D 69/026 |
| 11,287,004 | B1 * | 3/2022 | Liu | C04B 41/52 |
| 11,850,836 | B2 * | 12/2023 | Steinmetz | B32B 37/1027 |

(Continued)

*Primary Examiner* — Thomas W Irvin
(74) *Attorney, Agent, or Firm* — Peter Loffler

(57) ABSTRACT

A dual-layered graphene-based friction material is a paper matrix that is used as a high friction engagement lining in applications such as clutch plate or wet brake plate linings. The material uses a porous yet elastic fibrous base layer and a top layer containing thermally conductive graphene nanoplatelets mixed with a thermosetting resin. The top layer increases the overall thermal capacity while maintaining sufficient material porosity that allows satisfactory cooling oil flow through the material.

14 Claims, 6 Drawing Sheets

(56) References Cited

U.S. PATENT DOCUMENTS

| | | | | |
|---|---|---|---|---|
| 2018/0128335 A1* | 5/2018 | Sin Xicola | ............ | F16D 69/026 |
| 2021/0207674 A1* | 7/2021 | Pridgen, Jr. | ............. | F16D 13/74 |
| 2022/0010856 A1* | 1/2022 | Steinmetz | ............... | B32B 39/00 |
| 2024/0424763 A1* | 12/2024 | Brewin | ................... | B32B 27/14 |

\* cited by examiner

DUAL-LAYERED GRAPHENE-BASED WET FRICTION MATERIAL

BACKGROUND OF THE INVENTION

1. Field of the Invention

The present invention relates to a friction lining material and more specifically to a resin impregnated dual layer wet friction material that serves as the friction lining on either a clutch plate or on a brake pad plate and is formed as a paper matrix which comprises a porous fibrous base layer and a top layer formed from thermally conductive graphene nano-platelets (GNPs)

2. Background of the Prior Art

The wet friction materials used for friction clutch and brake applications, especially for heavy-duty high-performance transmission applications, require high power density, which is the energy power exerting onto a unit of surface of engagement. The thermal resistance and conductivity (capability of dissipating heat), mechanical strength, including compressive and shear strength, and elastic modulus of the wet friction materials, all relate to the power density. All of these properties must be judiciously considered while designing new wet friction material formulations and processing designs.

Paper based wet friction materials, which are commonly used as insulators for wet friction components, suffer from accumulation of heat generated on their surface during engagement. The high heat trapped by the engaged friction material results in a degradation of the thermally unstable resins and other components that are used to form the friction material. This degradation tends to cause an overall degradation and eventually destroy the integrity of the wet friction material. Accordingly, not only must the friction material maintain high thermal stability, the friction material must also be able to rapidly dissipate the high heat generated during engagement in order to prevent this degradation. Such considerations suggest the use of very dense materials, itself suggesting a relatively low porous structure. However, the use of a material having a relatively high porosity, allows cooling fluid used within a transmission or brake environment in which the material operates, to squeeze in and out of the pores of the wet friction material during engagement and disengagement of the clutch, which fluid flow helps to dissipate the heat from the engagement material.

Efforts have been made in developing porous wet friction materials for the heavy-duty torque converter, and dual clutch transmission applications. However, the achievement of high porosity has to be balanced against the mechanical strength of the clutch friction lining so that the compromise of competing characteristics results in a limitation of material design. Moreover, the friction modifier and additives present in the cooling fluids used, tend to diminish the porosity glazing of the surface of the clutch, resulting in a decreased friction coefficient and energy capacity of the wet friction material over time.

What is needed is a wet friction material that possesses high thermal capacity and power density of the clutch plates, wherein the material is highly thermally conductive yet relatively porous in order to capture the benefits afforded by the cooling fluids used within the wet friction environment. This friction material must be resilient yet resistant to the compression set of the wet friction material. Such a design must facilitate both fluid and solid based heat transfer in an efficient manner in order to achieve high heat capacity of the wet friction material. Accordingly, the use of highly thermal conductive ingredients, especially in high concentrations on the surface of engagement, is crucial for designing such high-power density wet friction materials.

GNPs have exhibited favorably high thermal conductivity, making graphene an ideal ingredient for formulating wet friction materials. However, graphene's high cost limits its use in high percentages within the single layer-based friction materials resulting in a challenge to get adequate levels of GNPs on the engaging surface.

Dual layer wet friction materials have been previously disclosed in which the friction modifier particles like carbon particles and silica powers such as diatomaceous earth were placed onto a fibrous base layer either via direct deposition or through top coating during resin saturation on the surface of fibrous base layer. These dual layer wet friction materials were relatively durable showing useful high performance. However, a significant increment in thermal conductivity was not found due to a limitation in thermal conductivity of the particles/powders residing on the top layer.

Therefore, a challenge exists to further improve the thermal conductivity of wet friction material via depositing/concentrating the highly thermal conductive ingredient onto the top layer. Such an innovation in both formulation and structural design needs to bring about a noticeable increase in thermal conductivity and capacity, and hence the power density of the material while reducing material cost in order to achieve a more economical solution.

In applicant Alto Products Corporation's previous patent, number U.S. Pat. No. 11,287,004, issued on Mar. 29, 2022, and incorporated herein by reference in its entirety, a graphene based wet friction material was disclosed exhibiting a desirable durability and wear resistance even with relatively low loading (3-6% by weight) of GNPs, making the invention an excellent candidate for heavy duty and high-performance friction applications. The instant invention continues the work disclosed in the previous patent.

SUMMARY OF THE INVENTION

The dual-layered graphene-based friction material of the present invention addresses the aforementioned needs in the art by providing a friction material usable as a lining in a clutch or brake application (wet applications) wherein the material exhibits superior thermal conductivity and capacity while maintaining sufficient porosity to allow cooling oils to flow through the material. The dual-layered graphene-based friction material relies on the involvement of high thermally conductive ingredients, specifically centered around the use of GNPs in low concentration (0.5%-2.5% based on friction liner weight) along with thermosetting resin powders being deposited onto a porous fibrous base layer that makes the friction material. The dual-layered graphene-based friction material facilitates both fluid and solid based heat transfer while retaining lower elastic modulus and good mechanical strength.

The goals are achieved via judicious material structural design of depositing relatively expensive and thermally conductive GNPs onto the surface of a porous fibrous base layer, the GNPs forming a top layer on this base layer. The GNPs are retained on the surface of the base layer in stable fashion via thermosetting resin powders that are mixed with GNPs in a ratio of about 1:1-3:1, by weight. This mixture is deposited onto the base layer made by a paper forming machine. The paper curing process used to form the paper matrix base layer allows the resin powders to firmly hold the GNPs on the surface of this base layer. Alternately, the GNPs can be deposited onto the base layer, as a top layer by a curtain coating, spraying, sprinkling or roll coating method.

Graphene exhibits excellent mechanical strength and thermal conductivity properties, each needed for high end wet friction applications such as within heavy-duty transmissions and torque convertors. The dual-layered graphene-based friction material imparts the end product with desirable heat dissipation characteristics. The increased heat transfer gained through the high thermal conductivity afforded by the use of the GNPs results in lower interface temperatures in the wet clutch environment so that degradation of the friction material due to high operating temperatures is reduced.

Specifically, the dual-layered graphene-based friction material of the present invention is comprised of a wet friction plate that has a friction plate member having a first side and a second side. A friction lining is comprised of a base layer that has a lower surface attached to the first side of the friction plate member, the first base layer also having an upper surface. The base layer is a porous, compressible, and resilient paper matrix member. The base layer has a top layer located on the upper surface of the base layer, wherein the top layer is a mixture of a resin and an amount of GNPs and such that the friction plate member is disposed and operates within a wet friction environment. The amount of the GNPs contained within the top layer is in the range of 0.5 percent to 2.5 percent based on friction liner weight. The resin within the top layer is a thermosetting resin. The friction plate member may be a clutch plate so that a second friction lining is disposed on the opposing side of the friction plate. The friction plate may be a brake plate.

BRIEF DESCRIPTION OF THE DRAWINGS

Similar reference numerals refer to similar parts throughout the several views of the drawings.

DESCRIPTION OF THE PREFERRED EMBODIMENT

Figure 1:
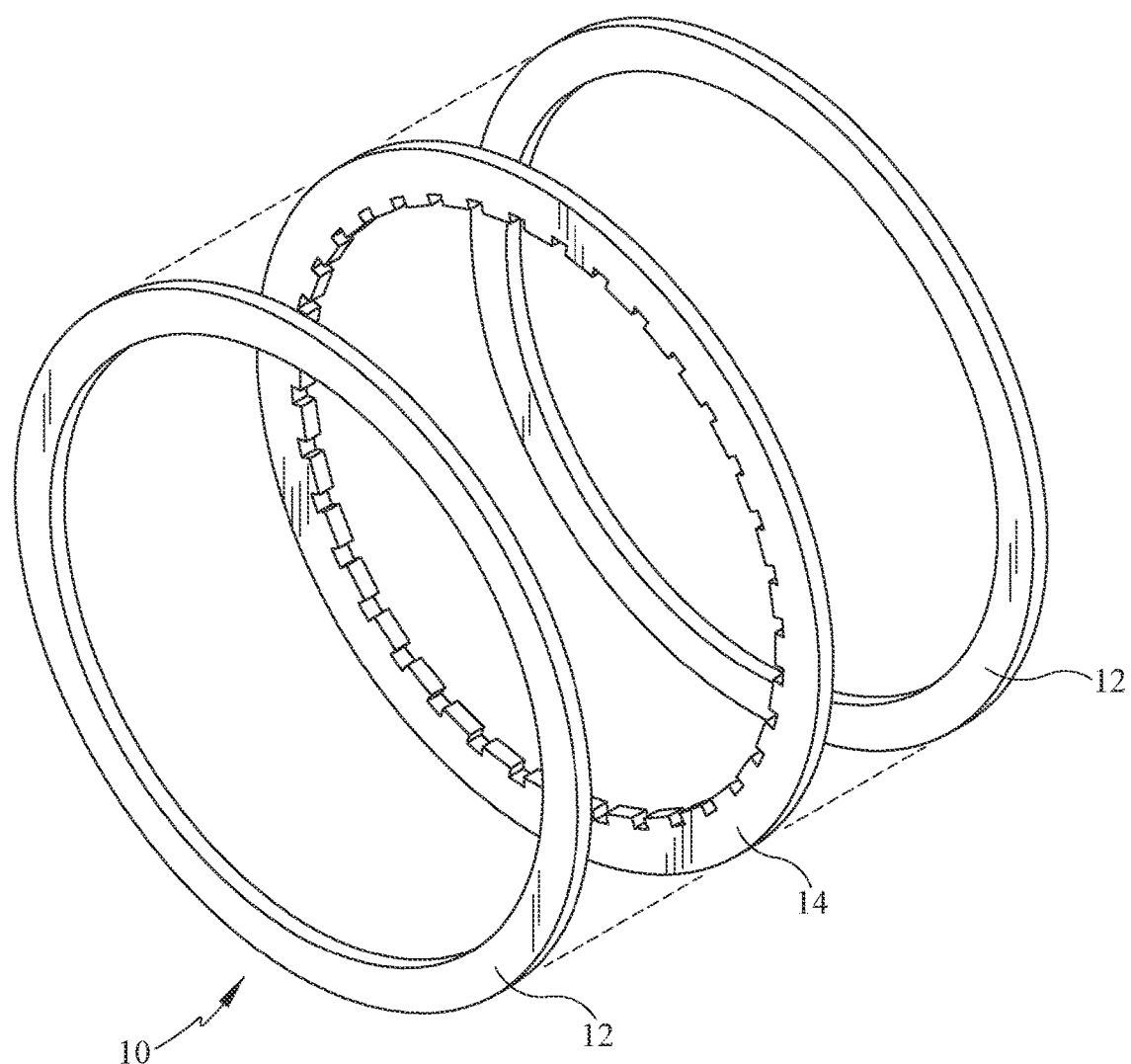
FIG. 1 is an exploded perspective view of a clutch plate produced from the dual-layered graphene-based friction material of the present invention.
Figure 2:
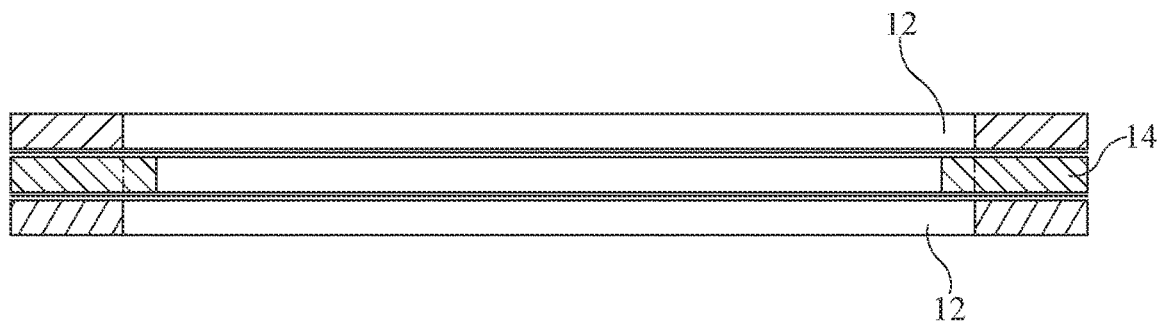
FIG. 2 is a side elevation view of the assembled clutch plate of FIG. 1.
Figure 3:
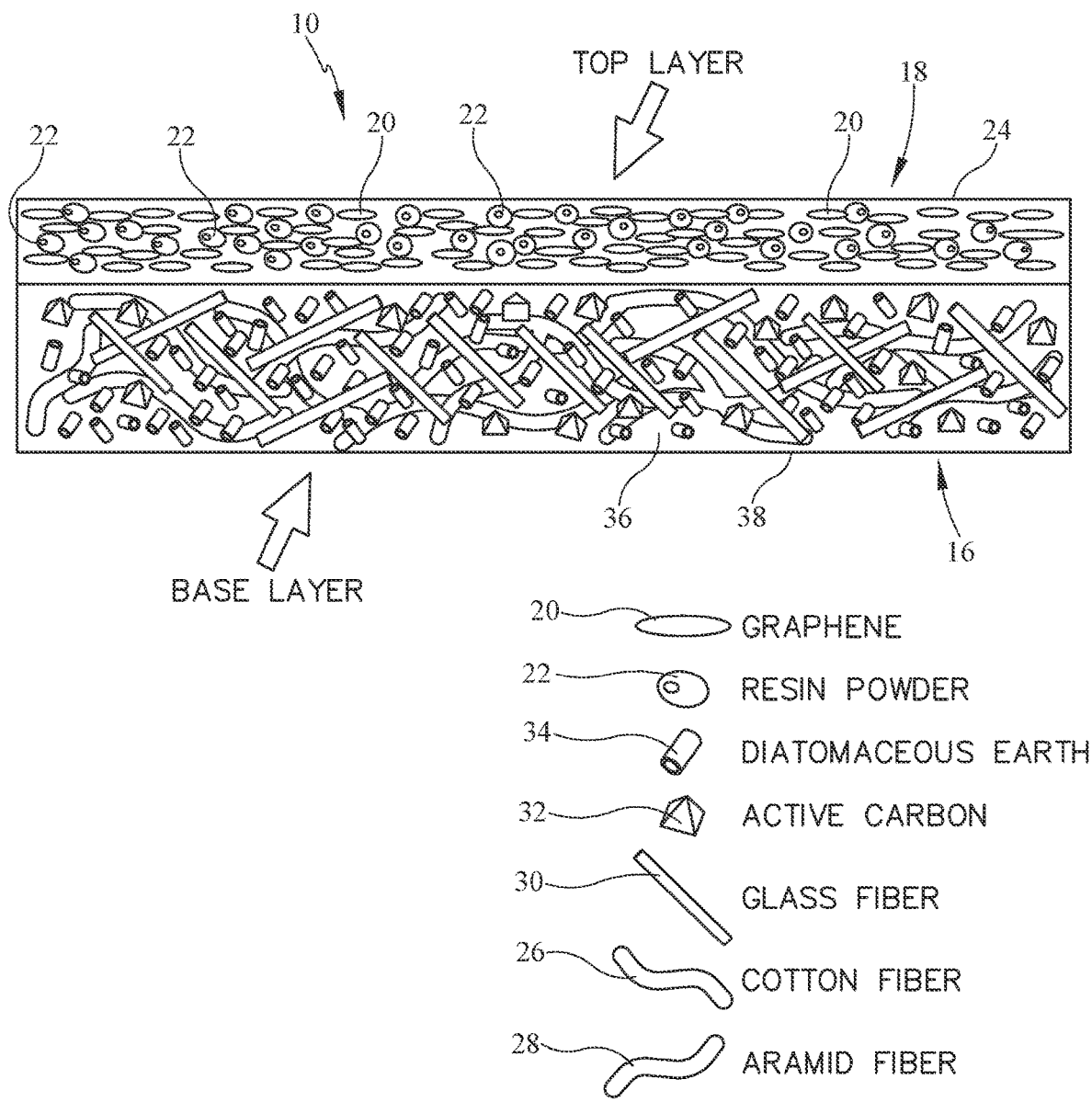
FIG. 3 is sectioned close-up view of a portion of the clutch plate.

Referring now to the drawings, it is seen that the dual-layered graphene-based friction material of the present invention, generally denoted by reference numeral 10, is comprised of a wet friction material that is formed in any desired method known in the art. The wet friction material is formed as a dual layer structure that is formed into a friction lining such as the illustrated clutch plate lining 12 that is attached to a clutch plate 14 in the appropriate manner.

The wet friction material is formed from a porous yet elastic fibrous base layer 16 and a top layer 18 deposited thereon. The top layer 18 contains thermally conductive GNPs 20 in the range of 0.5%-2.5% based on friction liner weight as well as thermosetting resin powders 22 that are deposited together onto the upper surface of the base layer 16 to form the top layer 18, the top layer 18 being the surface of engagement 24. The formulation for the base layer 16 includes various types and percentages of fibers (e.g., cotton fiber 26, aramid fiber 28, glass fiber 30, etc.), filler material (e.g., active carbon 32, diatomaceous earth 34, etc.), and an appropriate binder 36 (e.g., latex, resin, etc.,) which are each selected based upon their ability to improve the porosity, thermal resistance, material strength, flexibility/elasticity and internal structural integrity as needed for the end product of the dual-layered graphene-based friction material 10. The various materials selected must also be compatible with the fluid (e.g., automotive transmission fluid) being used in the environment in which the dual-layered graphene-based friction material 10 is being employed. The top layer 18 of the dual-layered graphene-based friction material 10 imparts a significant improvement in thermal conductivity and thereby facilitates efficient heat dissipation in a wet clutch or a wet brake environment over current materials.

An example formulation for the dual-layered graphene-based friction material 10 has a base layer 16 that comprises 5 to 20% by weight of a less fibrillated aramid fiber 28, 10 to 25%, by weight of cotton fibers 26, 10 to 20% by weight of glass fibers 30, 10 to 25%, by weight of activated carbon powders 32, 10 to 30% by weight of diatomaceous earth powders 34, 5 to 15% by weight of latex 36, and 5 to 12%, by weight of inorganic iron oxide pigments. The total fiber percentage is as high as 50 to 60%, by weight, based on the weight of the base layer 16 thereby resulting in a porous structure of the friction materials.

The involvement of the fibrillated aramid fibers 28, the cotton fibers 26, and the glass fibers 30 is mainly to reinforce the integrity of the wet friction material matrix resulting in a desirable porous structure of base layer 16 matrix. The cotton fibers 26 included in the wet friction material is for imparting "break-in" characteristics of the friction material as well as to give the material a relatively high coefficient of friction. The glass fibers 30, the less fibrillated aramid fibers 28, the active carbon powders 32, and the diatomaceous earth 34 increase the thermal resistance of the wet friction material, facilitating an efficient oil circulation within the friction material. The latex 36 works as a binder to bond the fibers and fillers together (occurring at a relatively low PH at about 4-5) in order to improve the tensile strength and integrity of the base layer 16. GNPs 20 in the range of about 0.5%-2.5% by weight based on the friction liner are mixed with thermosetting phenolic powders 22 in a ratio of about 1:1-1:3, by weight. The functionality of the thermosetting resin powders 22 is to bond and retain the GNPs 20 on the surface of the base layer 16 in stable fashion, preventing the GNPs 20 from becoming frictionally worn out during the frictional engagement of the dual-layered graphene-based friction material 10. As a result, high thermal conductivity and heat dissipation efficiency on the surface of engagement is properly retained. The thickness of the top layer 18 is around 5%-20% of the overall thickness of the dual-layered graphene-based friction material 10. The relatively low content of GNPs 20 within the top layer 18 is sufficient to allow the GNPs 20 to cover the surface of engagement 24 of the top layer 18 thereby keeping the desired high and consistent thermal conductivity without impairing the dual-layered graphene-based friction material 10 porosity.

Notably, a high percentage of GNPs impairs the porosity of the overall material while a low percentage of GNPs results in incomplete coverage on surface of engagement which results in inefficient thermal capacity and conductivity of the friction material. Therefore, it is central to balance the GNPs coverage on the surface of the top layer and the porosity of the materials via judicious adjustment the GNPs loading that is deposited onto the top layer in order to maximize an efficiency of the heat dissipation and power density of the friction materials.

If phenolic resin is relied solely for the saturation of the friction liner 12, the result is an engagement surface that is rigid and brittle resulting in inefficient surface contact between the friction plate formed and the mating reaction plate. This results in localized heat on the engagement surface and corresponding hot spots on the mating steel plate under high pressure power applications. Accordingly, Tung-oil or silicon modified phenolic resins are mixed together with the phenolic resin in a ratio of about 1:3 by weight, in order to improve the flexibility of the engagement surface 24. This improved flexibility avoids localized heat on the engagement surface 24 and the corresponding hot spots on the mating reaction plate.

The phenolic resin, residing in a compatible solvent, is blended or mixed with either the Tung oil or silicon modified phenolic resin for the impregnation of the raw friction paper. Upon resin impregnation of the dry friction material matrix, the impregnated friction material matrix is cured under a temperature of about 350 degrees Fahrenheit for 10 minutes after which the final product is a paper matrix used to form the dual-layered graphene-based friction material 10. The resin pick-up in the paper matrix is in the range of 25 percent to 45 percent by weight. To make the clutch friction plate for end applications, the plate lining 12 formed from the dual-layered graphene-based friction material 10 needs to be bonded onto the clutch plate 14 with the clutch plate 14 coated with adhesive on each side. The attachment surface 38 of the base layer 16 of the plate lining 12 is attached to the adhesive laden clutch plate 14 with the plate lining 12 and the clutch plate 14 bonded to each other under a certain temperature (usually about 400-450 degrees Fahrenheit) and bonding compression (usually in the range of about 2%-45%) making the GNPs 20 denser on the engagement surface 24. Such a bonding compression process further increases the thermal conductivity of the dual-layered graphene-based friction material 10, resulting in more efficient heat dissipation with a modest compromise of porosity loss within the friction material. It is important to optimize the bonding compression properly in order to balance the density of GNPs 20 on the engagement surface 24 and the material porosity in order to achieve the best heat capacity and power density of the material.

In order to prepare the fibrous base layer 16, the desired ingredients are obtained and each ingredient is measured for its correct proportion per the formulation. The measured ingredients are placed in their correct order into a pulper. During the pulping of the materials used for the raw friction paper, pH adjustments are made to about pH 8-10 using NaOH to improve dispersion followed by an adjustment of the pH to about pH 4-5 with alum to precipitate the latex 36 so as to achieve its bonding function for fibers and fillers. A retention aid of a cationic water-soluble polymer is added for an efficient flocculation of the pulps. The retention aid also helps the small sized filler particles obtain sufficient size, preventing them from falling through the wire mesh used during material production, thereby retaining consistent formulation weights. The resulting pulp is conveyed onto a paper mold and allowed to drain onto a wire mesh, generating a firm and stable base layer paper matrix. Notably, additional vacuum processing helps firm up the base layer 16 matrix, making the matrix stable for the following deposition process. The fibrous base layer 16 is porous (porosity before GNP 20 deposition: 5.1 second, Gurley Densometer, Model 4110, 5-ounce cylinder, 100 cc oil and orifice: 1 inch in diameter).

The GNPs 20 and phenolic resin powders 22 are mixed for uniformity and in a ratio of about 1:1-1:3 by weight. Once the base layer 16 is firmly formed into its the paper mode upon drainage of the water, a certain amount of water is added gently above the base layer 16 in the deckle without disturbing the base layer 16 matrix formed. Thereafter, the GNPs 20 and thermosetting resin powder 22 mixture is added in the water along with gentle stirring, in order to achieve GNPs 20 and resin powder 22 in the water uniformly before drainage of water above the base layer 16 to form the top layer 18. The process of GNP 20 and resin powder 22 deposition onto the base layer 16 changes the porosity of the base layer 16 from 5.1 to 10.6 second.

Once the raw paper matrix is formed in a roll, sheet or shape form, a resin saturation and curing process is conducted for imparting the paper with better mechanical and shear strength. The resin ingredients are obtained per their formulation amounts. An impregnation bath is produced and mixed with a dilution solvent. The raw paper matrix is impregnated by the resin within the resin bath. The resulting paper matrix, impregnated with resin, is air dried and then partially cured. The result is a resin impregnated friction paper or wet friction material. Thereafter, the wet friction material (dual-layered graphene-based friction material 10) is formed into its desired shape, such as a plate lining 12 and attached to a clutch plate 14 or brake pad plate in appropriate manner.

Alternatively, a base friction paper matrix is formed then rolled or sheet/component formed and impregnated with a thermosetting resin solution after which the wetted friction paper is curtain coated, sprayed, sprinkled or roll coated with a suspension containing GNPs 20, thermosetting resin 22 and solvent. The resulting paper matrix, impregnated with resin, is oven air dried and partially cured. The result is a resin impregnated friction paper or wet friction material (dual-layered graphene-based friction material 10) which is now ready to be processed into a clutch or brake application as previously noted.

The specific GNPs 20 used are exfoliated raw and natural graphite nanoplatelets. Such GNPs are short stacks of graphene sheets in the form of an ultra-thin platelet having average thickness of 1-21 nm, an average lateral diameter of 0.5-25 µm, a surface area of 60-750 m$^2$/g, and a bulk density of 0.03-0.4 g/cm$^3$. Advantageously, the GNPs are highly purified in carbon content (>95% carbon content), yet possess a high crystalline structure, low in defects. This bulk material should have a pristine graphitic surface of sp$^2$ carbon molecules that, along with its fluffy characteristic, makes the bulk material especially suitable for applications requiring high thermal conductivity. These GNPs also improve mechanical properties such as stiffness, abrasion resistance, and surface hardness of the matrix material. However, other forms of graphene can also be employed.

These GNPs are compatible with resin, forming a stable nanoplatelet suspension upon application of an efficient mixing process, so as to be a favorable ingredient for working with resin for both top saturation and roller-based coating processes. It is noted that the GNPs can either be curtain coated, spray coated, sprinkled or roll coated onto the top layer. These processes are able to achieve higher concentration of GNPs 20 on the engagement surface 24 for improved performance, without significantly compromising product cost.

Figure 4:
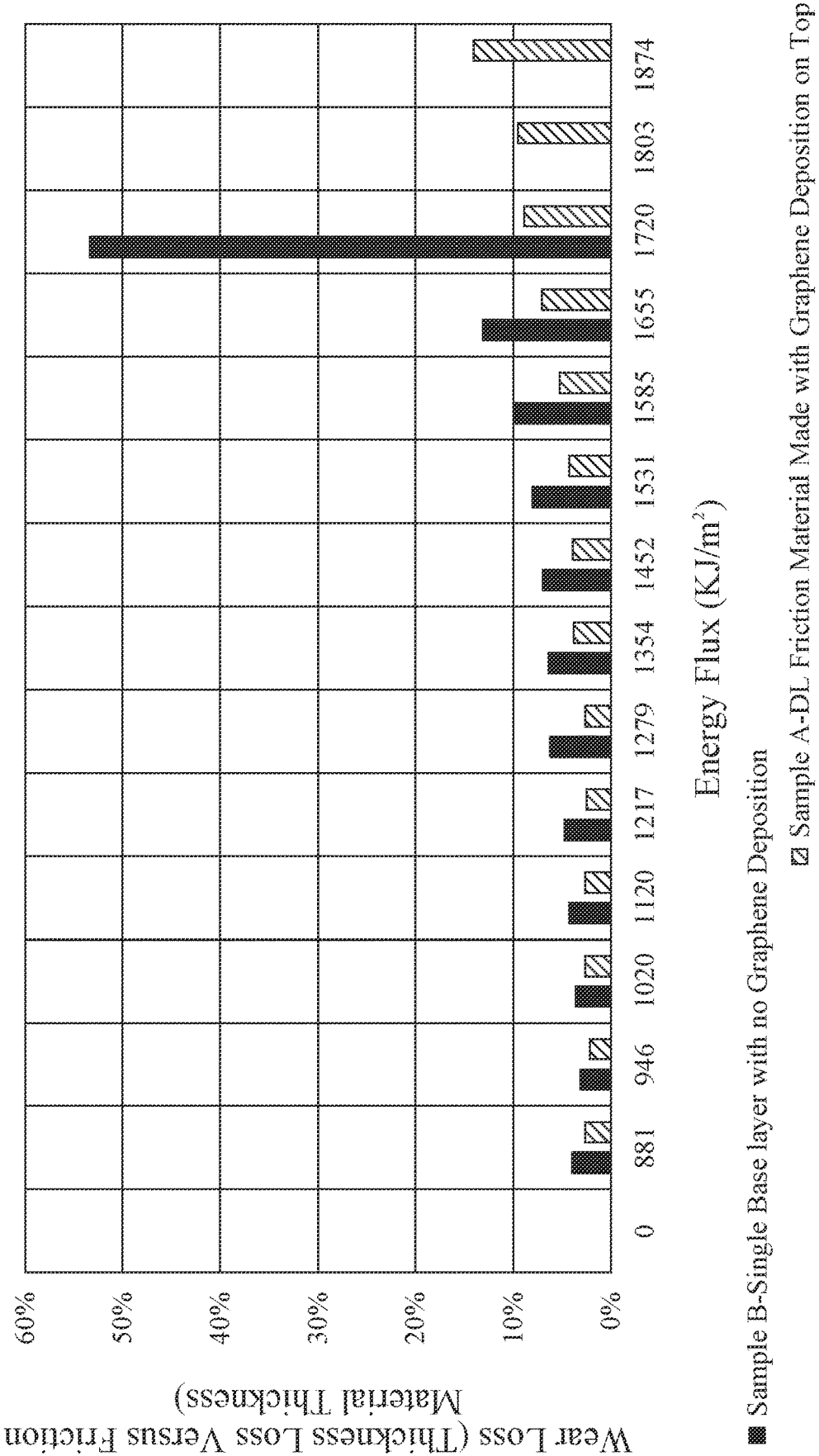
FIG. 4 is a graph illustrating a wear resistance comparison between the dual-layered graphene-based friction material made with direct GNP deposition onto the base layer and a single base layer.

Testing Results and Performance: The dual-layered graphene-based friction material 10 exhibits superior energy capacity relative to traditional paper based porous materials used in heavy-duty friction applications. Moreover, the dual-layered graphene-based friction material exhibits significant economic advantage versus single layer graphene based wet friction material due to a significant reduction in GNP loading in the paper. In order to verify the performance difference in before and after GNP/resin powder deposition and benefits gained in performance upon forming GNP laden top layer, two samples including a sample A of the dual-layered graphene-based friction material 10 of the present invention and a sample B of a single layer wet friction materials having a formulation that is the same as the base layer of the sample A were tested. These two samples were tested by standard J2488 6000 RPM step level test in Dexron VI oil using SAE #2 friction test machine in order to make a comparison in their durability and wear resistance. A failure criterion was set as 20% friction materials thickness loss versus the overall friction liner thickness. FIG. 4 shows wear resistance of sample A and sample B with an increase of energy density exertion on the friction materials. It is evident that an energy density as high as 1874 KJ/m$^2$ (14 energy level) was achieved for sample A which is 200 KJ/m$^2$ (more than 10%) higher than that for sample B. Moreover, it is seen that an almost twofold capability increase of wear resistance throughout all the energy levels was achieved before reaching the failure criterion for samples A compared to sample B, showing significant durability and wear resistance capability improvement. Notably, the extraordinary durability and wear resistance of the dual-layered graphene-based friction material 10 is due to efficient heat dissipation capability of the material attributed to allocation of the GNPs 20 on the top layer 18 of the dual-layered graphene-based friction material 10. Moreover, the porous yet elastic structural characteristics of the dual-layered graphene-based friction material 10 allows efficient oil circulation within the material, thereby carrying the heat out which contributes to improved heat capacity and power density of the dual-layered graphene-based friction material 10.

Figure 5:
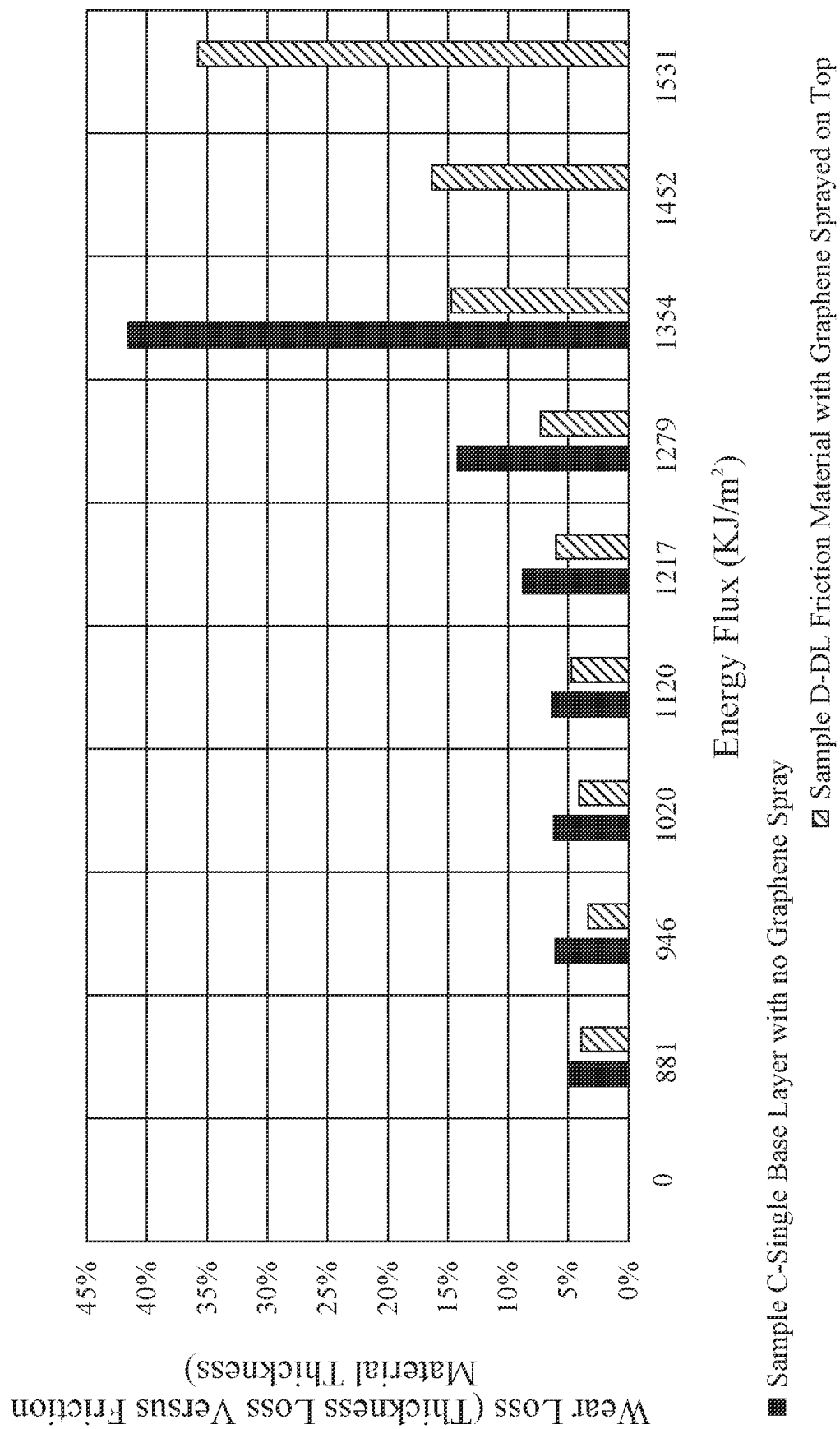
FIG. 5 is a graph illustrating a wear resistance comparison between the dual-layered graphene-based friction material made with GPN spray coating onto the base layer and the single base layer.

The dual-layered graphene-based friction material 10 made from graphene spray coating process onto the porous base layer 16, sample C, was tested and evaluated against a sample D comprising a single layer wet friction material having a formulation that is the same as the base layer of the sample C for their respective wear resistance and durability. FIG. 5 demonstrates that around 10% better wear resistance capability of the dual-layered graphene-based friction material 10 is achieved when compared with the baseline material, sample D, further verifying a significant improvement in wear resistance/durability upon depositing GNPs 20 onto the base layer 16.

The dual-layered graphene-based friction material 10 made either from GNP deposition demonstrated by sample A, or from a GNP spray coating process demonstrated by sample C, each outperformed the single layer material. The GNPs residing on the engagement surface 24 of the dual-layered graphene-based friction material 10 function in a manner that facilitates heat dissipation, thereby lowering the material's surface working temperature helping the material avoid being worn out due to the thermal energy impact on the material's engagement surface 24.

Figure 6:
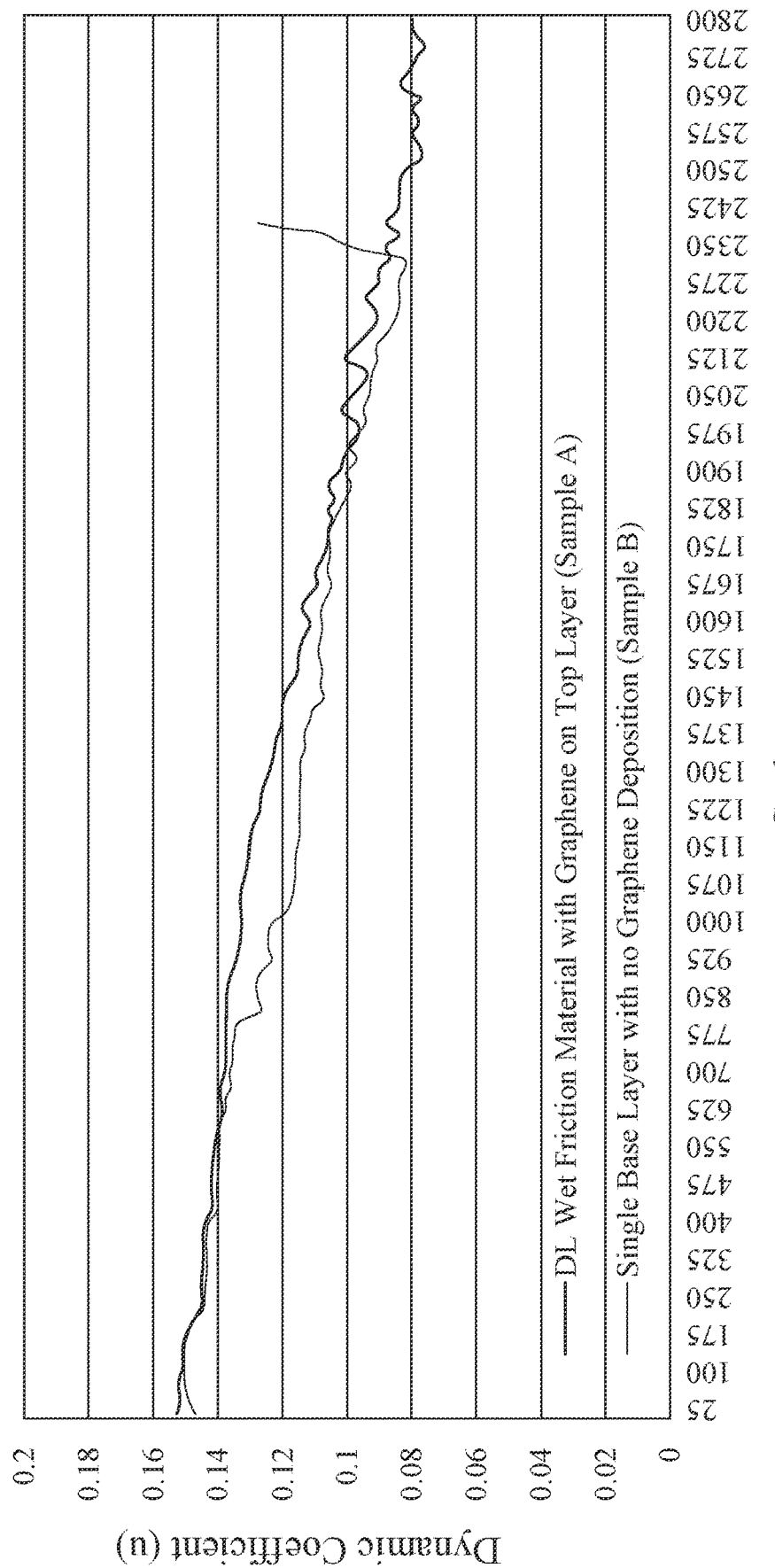
FIG. 6 is a graph illustrating a dynamic coefficient comparison between the dual-layered graphene-based friction material made with direct GNPs deposition onto the base layer and a single base layer, tested with SAE standard J2488 6000 RPM step level tests using SAE NO. 2 friction testing machine.
Figure 7:
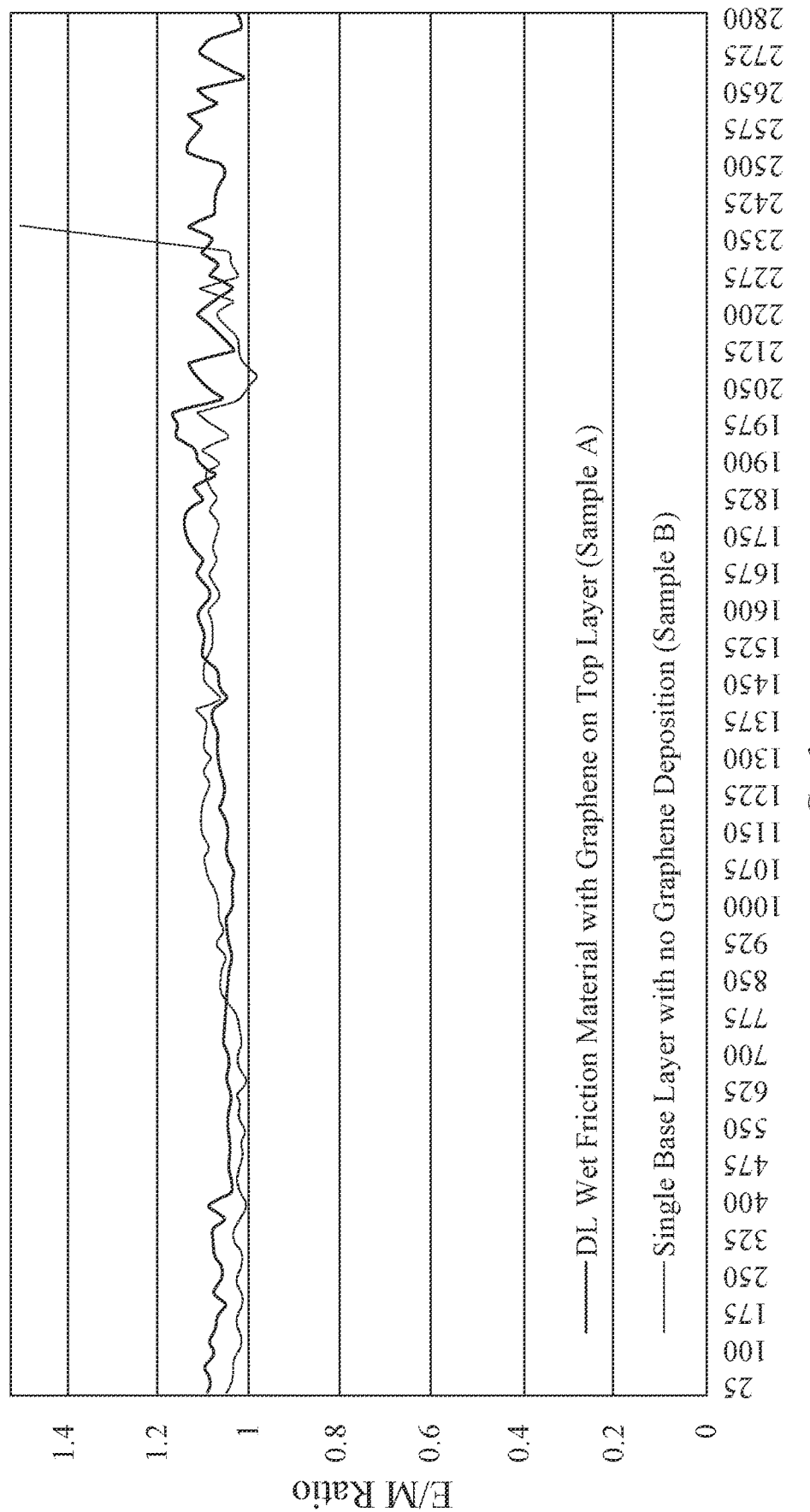
FIG. 7 is a graph illustrating a dynamic coefficient comparison between the dual-layered graphene-based friction material made with GNPs spray coating onto the base layer and a single base layer, tested with SAE standard J2488 6000 RPM step level tests using SAE NO. 2 friction testing machine.

Additionally, as seen in FIG. 6, an improvement in dynamic coefficient improvement and relatively equivalent E/M ratio in FIG. 7 of the dual-layered graphene-based friction material 10 is achieved, since the E/M ratio is an indication of the shudder resistance capability of the dual-layered graphene-based friction material 10.

While the invention has been particularly shown and described with reference to an embodiment thereof, it will be appreciated by those skilled in the art that various changes in form and detail may be made without departing from the spirit and scope of the invention.

We claim:

1. A wet friction plate comprising:
   a friction plate member having a first side and a second side;
   a first base layer having a first lower surface attached to the first side of the friction plate member, the first base layer also having a first upper surface, the first base layer being a porous, compressible, and resilient paper matrix member;
   a first top layer deposited atop the first upper surface of the first base layer, the first top layer being formed from a mixture of a resin and an amount of graphene nanoplatelets in the range of 0.5 percent to 2.5 percent based on the first base layer's weight and such that the friction plate member, including the attached first base layer and the first top layer, is disposed and operates within a wet friction environment; and
   wherein the first base layer and the first top layer form a two-ply friction material wherein a first ply of the two-ply friction material is the first base layer and a second ply of the two-ply friction material being the first top layer and wherein the first ply and the second ply are structurally non-homogenous as the first base layer is not formed from the mixture.

2. The wet friction plate as in claim 1 wherein the resin is a thermosetting resin.

3. The wet friction plate as in claim 1 wherein the friction plate member is a clutch plate.

4. The wet friction plate as in claim 1 wherein the friction plate member is a brake plate.

5. The wet friction plate as in claim 1 further comprising:
   a second base layer having a second lower surface attached to the second side of the friction plate member, the second base layer also having a second upper surface, the second base layer being a porous, compressible, and resilient paper matrix member; and
   a second top layer located atop the second upper surface of the second base layer, the second top layer being a mixture of a resin and an amount of graphene nanoplatelets in the range of 0.5 percent to 2.5 percent based on the second base layer's weight.

6. The wet friction plate as in claim 5 wherein the resin is a thermosetting resin.

7. The wet friction plate as in claim 5 wherein the friction plate member is a clutch plate.

8. A wet friction plate comprising:
   a friction plate member having a first side and a second side;

a first base layer having a first lower surface attached to the first side of the friction plate member, the first base layer also having a first upper surface, the first base layer being a porous, compressible, and resilient paper matrix member;

a first top layer deposited atop the first upper surface of the first base layer, the first top layer being formed from a mixture of a resin and an amount of graphene nanoplatelets in the range of 0.5 percent to 2.5 percent based on the first base layer's weight and such that the friction plate member, including the attached first base layer and the first top layer, is a wet friction plate member; and wherein the first base layer and the first top layer form a two-ply friction material wherein a first ply of the two-ply friction material is the first base layer and a second ply of the two-ply friction material being the first top layer and wherein the first ply and the second ply are structurally non-homogenous as the first base layer is not formed from the mixture.

9. The friction plate as in claim 8 wherein the resin is a thermosetting resin.

10. The friction plate as in claim 8 wherein the friction plate member is a clutch plate.

11. The friction plate as in claim 8 wherein the friction plate member is a brake plate.

12. The wet friction plate as in claim 8 further comprising:
    a second base layer having a second lower surface attached to the second side of the friction plate member, the second base layer also having a second upper surface, the second base layer being a porous, compressible, and resilient paper matrix member; and
    a second top layer located atop the second upper surface of the second base layer, the second top layer being formed from the all mixture of a resin and an amount of graphene nanoplatelets in the range of 0.5 percent to 2.5 percent based on the second base layer's layer weight.

13. The friction plate as in claim 12 wherein the resin is a thermosetting resin.

14. The friction plate as in claim 12 wherein the friction plate member is a clutch plate.

\* \* \* \* \*